PRODUCTION OF BERYLLIUM

Leslie Jack Derham, Avonmouth, England, assignor to The National Smelting Company Limited, London, England
No Drawing. Filed May 2, 1960, Ser. No. 25,830
Claims priority, application Great Britain May 5, 1959
8 Claims. (Cl. 75—84.4)

This invention relates to the production of beryllium.
In one method for the production of beryllium, beryllium fluoride is heated with magnesium raspings. The reduction reaction is:

$$BeF_2 + Mg = Be + MgF_2 \qquad (1)$$

A convenient form of beryllium fluoride is the ammonium beryllium fluoride but if the latter is heated up to the temperature required for decomposition according to the equation:

$$(NH_4)_2BeF_4 \rightarrow BeF_2 + 2NH_4F \qquad (2)$$

then there occurs undesired fusion of the double fluoride before the necessary temperature (ca. 900° C.) is reached. There is the additional disadvantage that at this temperature the beryllium fluoride produced is molten and tends to dissolve impurities from any crucible material used.

The present invention consists of an improvement in said method in which in order to prepare the reactants magnesium particles such as raspings are mixed with ammonium beryllium fluoride, the mixture is briquetted and the briquettes are heated in vacuo to remove ammonium fluoride gas.

In this way the ammonium fluoride is driven off in the vapour phase below the temperature at which ammonium beryllium fluoride starts to melt. The beryllium fluoride which remains is in the solid state and is, without any further treatment being necessary, capable of being reduced to yield beryllium metal by the action of the magnesium already present in the briquette.

The briquettes of beryllium fluoride have the same volume as the original ammonium beryllium fluoride briquettes and it may be advisable to subject these beryllium fluoride briquettes to a form of pressure treatment in order to densify them.

The briquettes of intimately mixed beryllium fluoride and magnesium may then be reduced.

It is usually necessary to have some salt present other than magnesium fluoride in order to obtain a fluid melt at the reduction temperature. There are two methods of achieving this. In one method the amount of magnesium to be added as raspings is in the proportion required to form beryllium metal by the Reaction 1. These briquettes are then immersed in a bath of fusible salt, which will not react with beryllium, such as calcium chloride.

In the other method, the magnesium is mixed with ammonium beryllium fluoride containing more beryllium than is equivalent to the magnesium. After volatilizing the ammonium fluoride, there is left a mixture of magnesium and excess beryllium fluoride. On heating, the magnesium reacts with beryllium fluoride to produce beryllium and magnesium fluoride, and the excess beryllium fluoride forms a fusible salt with the magnesium fluoride. In this second method mentioned, the reduction can be carried out without the need to use a bath of calcium chloride since the excess of beryllium fluoride supplies the necessary fluidity to the final melt.

Example 100 gm. of ammonium beryllium fluoride and 20 gm. of magnesium raspings were made into small briquettes and heated at 400° C. for six hours in vacuo (28″ Hg) to remove ammonium fluoride gas. The briquettes were then immersed in a bath of calcium chloride at 1000° C., heated to 1350° C. and held at this temperature for one hour. After cooling to room temperature, the melt was leached in water to dissolve the calcium chloride and was then filtered. No beryllium was detected in the filtrate, indicating that Equation 1 had gone to completion: 4.7 gms. of beryllium was recovered in the form of small beads. This represented a recovery of 63% of the beryllium originally present in the ammonium fluoberyllate. Very finely divided metal was also formed in the calcium chloride bath. This may be separated from the magnesium fluoride crystals in the same size range by froth flotation or a "sink-float" process.

If an excess of beryllium fluoride was taken e.g. if the amount of magnesium was 75% of the amount equivalent to the beryllium fluoride, the calcium chloride bath was unnecessary.

Various modifications may be made within the scope of the invention.

I claim:
1. In the method of producing beryllium metal in a crucible containing impurities that tend to dissolve in the presence of molten beryllium fluoride, the improvement in combination therewith which comprises mixing intimately solid particles of magnesium with solid particles of ammonium beryllium fluoride, compacting the resulting mixture of solids to form briquettes, heating the briquettes in a crucible under a low vacuum below the melting temperature of the ammonium beryllium fluoride but at a temperature high enough to form solid beryllium fluoride and ammonium fluoride gas thereby avoiding the fusion of beryllium fluoride and hence dissolution of said impurities in the crucible, removing the ammonium fluoride gas from the system while it is still under vacuum, thus leaving the volume of the resulting briquettes at substantially their former volume, then at an elevated temperature reacting the beryllium fluoride with the magnesium present in the briquettes to produce magnesium fluoride and the desired beryllium metal, carrying out said two chemical reactions consecutively bringing about the transition from the first reaction (decomposition) to the second reaction (reduction) purely by changing the temperature and the pressure of the system and without any introduction of further reactants into the system between the two reaction stages and without any handling of the original reaction mixture, and separately recovering the beryllium metal from the magnesium fluoride.

2. Method according to claim 1, in which the ammonium fluoride free briquettes containing the solid beryllium fluoride and magnesium are densified under pressure before they are subjected to reduction with the magnesium.

3. Method according to claim 1, in which the ammonium fluoride free briquettes containing the solid beryllium fluoride and magnesium are immersed in a bath of fusible salt which will not react with the beryllium but which will supply fluidity to the final melt.

4. Method according to claim 1, in which the ammonium fluoride free briquettes containing the solid beryllium fluoride and magnesium are densified under pressure before they are subjected to reduction with the magnesium, and the densified briquettes are immersed in a bath of fusible salt that will not react with the beryllium but which will supply fluidity to the final melt.

5. Method according to claim 1, in which the ammonium fluoride free briquettes containing the solid beryllium fluoride and magnesium are immersed in a bath of fusible calcium chloride salt which will not react with the beryllium but which will supply fluidity to the final melt, the melt is cooled, and the cooled melt is then leached with water for removing the calcium chloride.

6. Method according to claim 1, in which the ammonium fluoride free briquettes containing the solid beryllium fluoride and magnesium are densified under pressure before they are subjected to reduction with the magnesium, and the densified briquettes are immersed in a bath of fusible calcium chloride salt that will not react with the beryllium, but which will supply fluidity to the final melt.

7. Method according to claim 1, in which the ammonium beryllium fluoride contains more beryllium than is equivalent to the magnesium present in the briquettes, the magnesium reacts with the beryllium fluoride on heating to produce beryllium and magnesium fluoride, and the excess beryllium fluoride forms a fusible salt with the magnesium fluoride to supply fluidity to the final melt.

8. Method according to claim 1, in which the ammonium beryllium fluoride contains more beryllium than is equivalent to the magnesium present in the briquettes, the ammonium fluoride free briquettes containing the solid beryllium fluoride and magnesium are densified under pressure before they are subjected to reduction with the magnesium, the magnesium reacts with the beryllium fluoride on heating to produce beryllium and magnesium fluoride, and the excess beryllium fluoride forms a fusible salt with the magnesium fluoride to supply fluidity to the final melt.

References Cited in the file of this patent

UNITED STATES PATENTS

| | | |
|---|---|---|
| 1,740,857 | Kroll | Dec. 24, 1929 |
| 2,072,067 | Donahue | Feb. 23, 1937 |
| 2,091,087 | Wempe | Aug. 24, 1937 |
| 2,205,854 | Kroll | June 25, 1940 |
| 2,381,291 | Kjellgren | Aug. 7, 1945 |
| 2,809,887 | Runnalls | Oct. 15, 1957 |
| 2,889,221 | Singleton | June 2, 1959 |

FOREIGN PATENTS

| | | |
|---|---|---|
| 218,877 | Australia | Nov. 26, 1958 |
| 508,028 | Great Britain | June 23, 1939 |
| 582,040 | Great Britain | Nov. 4, 1946 |
| 781,100 | Great Britain | Aug. 14, 1957 |